Figure 1:
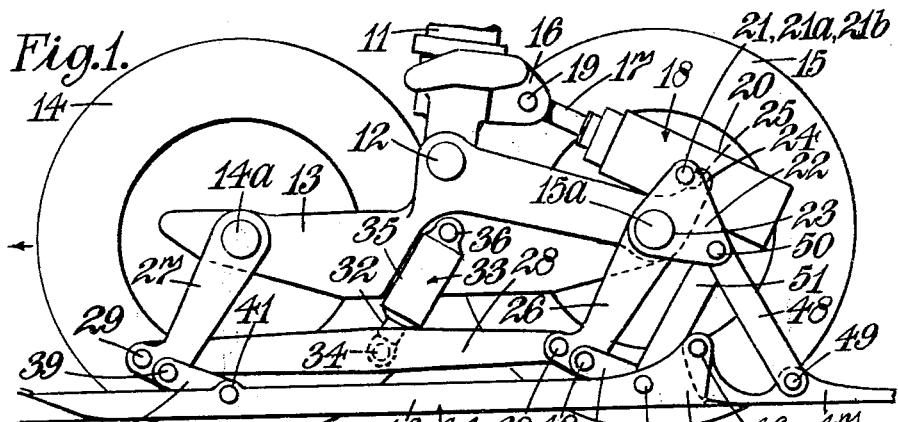

Nov. 28, 1961  N. S. MOSS ET AL  3,010,682
AIRCRAFT UNDERCARRIAGES
Filed Feb. 2, 1959  2 Sheets-Sheet 2

3,010,682
Patented Nov. 28, 1961

3,010,682
AIRCRAFT UNDERCARRIAGES
Norman Sidney Moss and George Orloff, Cheltenham, and Arthur Scott, Bournemouth, England, assignors to Rotol Limited, Gloucester, England, a British company
Filed Feb. 2, 1959, Ser. No. 790,417
Claims priority, application Great Britain Feb. 12, 1958
13 Claims. (Cl. 244—108)

This invention relates to aircraft undercarriages and is concerned with undercarriages which incorporate a skid.

Herein the term skid is used compendiously and includes skid, ski and the like.

According to one aspect of the invention there is provided in or for an aircraft, a skid mechanism comprising in combination an undercarriage adapted to carry at least one ground engaging wheel, a skid, a linkage movable between an extended position and a contracted position connecting the skid and undercarriage and spring means for urging the linkage to its extended position. Preferably said linkage embodies a parallel motion link work.

According to another aspect of the invention there is provided for supporting a skid on an aircraft undercarriage, a retraction linkwork having at least four supporting links freely pivoted to one another and arranged in the form of a quadrilateral and a jack or the like connected within the linkwork so that on movement thereof the linkwork will distort and the skid will move relatively to the undercarriage. Preferably the jack is connected at its opposite ends respectively to the supporting links bounding opposite sides of the linkage and is arranged so that it is not parallel to any of the four lines each of which extends between adjacent pivot axes of the linkwork. The jack may be connected to the said supporting links intermediate the ends thereof.

Conveniently one of the supporting links is constituted by a bogie adapted to be connected to the aircraft undercarriage and to carry ground-engaging wheels.

The retraction linkwork may further comprise a pivot member coupled to the bogie to pivot about the same axis as the aft supporting link, this pivot member being connected at axes spaced from each other and from the same axis respectively (a) to one end of a first guide link pivoted at its other end to the skid and (b) to one abutment of the spring the other abutment being adapted to be connected to the strut.

Conveniently the skid is in two parts, namely a forward part and a rearward part which parts are pivoted together, wherein the first guide link is connected to the forward part of the skid and wherein a second guide link is provided pivoted at one end to the rearward part of the skid and at its other end to the pivot member to pivot relatively to the pivot member about the same axis as does the first guide link. These first and second guide links are not the supporting links.

Preferably, the spring is an air spring.

The invention in another of its aspects includes a skid mechanism, as set out in the third paragraph herein, which skid mechanism embodies a retraction linkwork as set out in the fourth paragraph herein.

Figure 2:
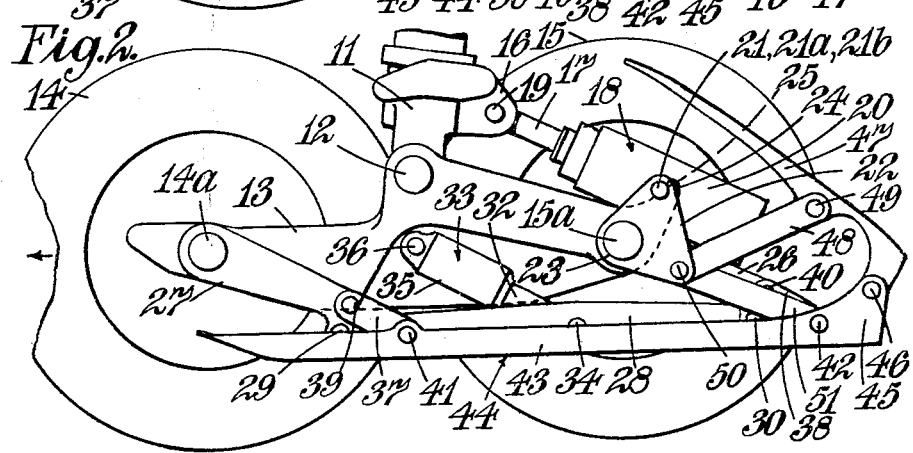
Figure 3:
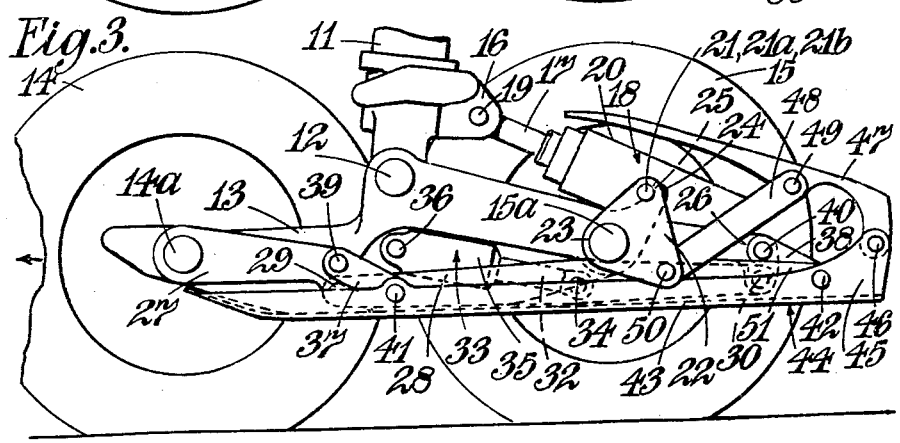
Figure 4:
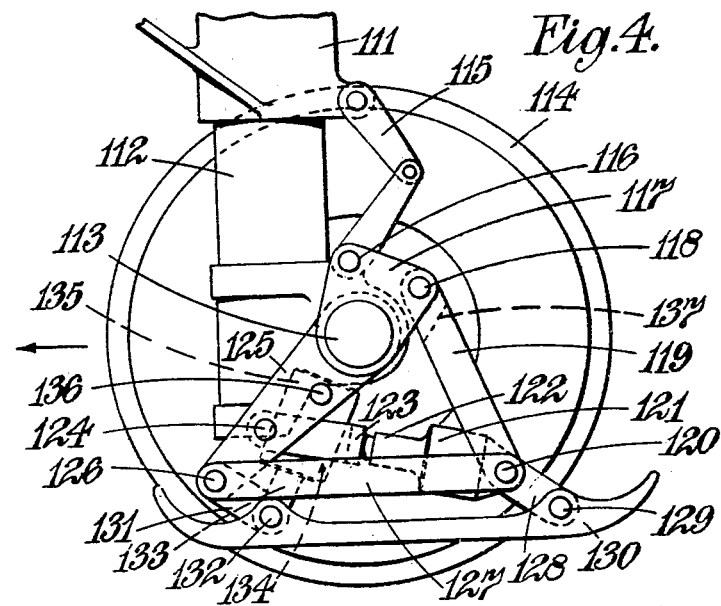
Figure 5:
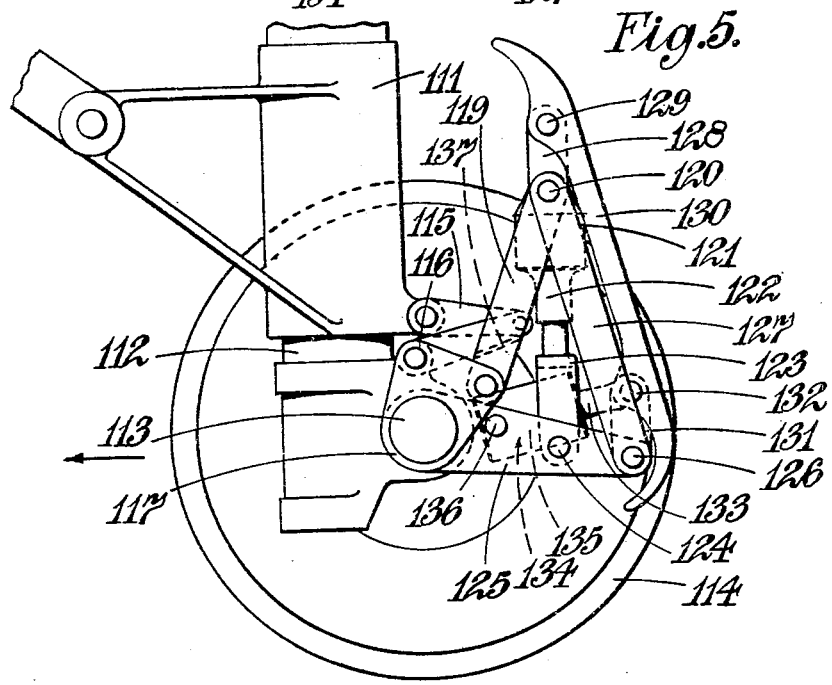

Two embodiments of the invention will now be described by way of example with reference to the accompanying drawings, of which, FIGURE 1 shows a bogie undercarriage and retractable skid arrangement embodying the invention, with the skid in the extended position, FIGURE 2 shows the same arrangement with the skid partially retracted with respect to the bogie, FIGURE 3 shows the same construction with the skid in the fully retracted position, FIGURE 4 shows a twin steerable nosewheel arrangement embodying the invention and with the skid in the extended position, and FIGURE 5 shows the arrangement of FIGURE 4 with the skid in the retracted position.

Referring to FIGURE 1, a main strut 11, part only of which is shown, is provided at its lower end with a pivotal connection 12 to a bogie frame 13, the latter carrying a pair of front wheels 14 upon an axle 14a, and a pair of rear wheels 15 upon an axle 15a. Only one of each of the wheels 14 and 15 is shown. The main strut 11 includes a shock absorber (not shown) and at its upper end is either fixedly secured to the associated aircraft structure in the case of a fixed undercarriage, or alternatively is hinged to the airframe for retraction of the undercarriage as a whole.

A pair of integrally formed lugs 16 is provided rearwardly of the main strut 11 at its lower end. The piston rod 17 of an oleo-pneumatic air-spring damper 18 is pivotally connected at 19 to the lugs 16. The cylinder 20 of the damper 18 is pivotally mounted at 21 between a pivot member in the form of a pair of identical triangularly shaped plates 22, being carried by two coaxial pivot pins 21a and 21b respectively located in the plates at registering corners of the plates.

The rearward part of the frame 13 is forked and extends between the pair of plates 22. The rear wheel axle 15a passes through registering circular apertures 23 at second corners of the plates 22. The rearward extremity of each of the forks of the frame 13 is provided with an upwardly directed ear 24 which extends through the space between each plate 22 and the cylinder 20 of the damper 18. As shown in FIGURE 1 each ear 24 lies aft of the pivot pins 21a, 21b and is provided with a semi-circular seating 25 in its forward face, this seating 25 forming a stop for the associated pivot pin 21a, 21b, the purpose of which is later described.

The axle 15a also has pivoted thereto the ends of the longer arms of a pair of L-shaped links 26, and similarly the axle 14a has the end of the longer arms of a pair of L-shaped links 27 pivoted on it. These links 26, 27 are cranked forwardly at their lower ends as shown in the drawings to provide the shorter arms of the links. A pair of connecting links 28 are pivotally attached at their forward ends at 29 to he shorter arms of the links 27 and at their rearward ends at 30 to the shorter arms of the links 26. The bogie 13, L-shaped links 26, 27 and the connecting links 28 in effect define a quadrilateral having pivots 14a, 15a, 30 and 29.

The piston rod 32 of a skid retraction jack 33 is pivotally connected at 34 to both connecting links 28 at a point approximately midway along the length of these links. The cylinder 35 of the retraction jack is pivotally connected at 36 to the bogie 13 so that when, as shown in FIGURE 1, the skid is extended the jack 33 lies parallel to the longer arms of the links 26, 27. The jack 33 is thus inclined relative to the lines joining 14a to 29 and 15a to 30. The retraction jack is conveniently provided wtih internal locking means by means of which it can be locked in its most extended and retracted positions, A pair of links 37 is pivotally connected to links 27 at 39 near the join of the longer and shorter arms. A similar pair of links 38 is pivotally connected to links 26 near the join of the longer and shorter arms at 40. These pairs of links 37, 38 are further respectively pivotally connected at 41 and 42 to the forward member 43 of a two-piece landing skid 44.

The member 43 is provided integrally with a pair of laterally spaced upwardly directed flanges 45 between which an integral lug part of a rearward member 47 of the skid 44 is pivotally connected at 46.

A pair of guide links 48 couples member 47 and the third corners of the triangularly shaped plates 22, by virtue of pivotal connections 49 and 50 on the member 47 and plates 22 respectively. Pivotal connections 50 also carry a pair of guide links 51 which connects with pivots 42 towards the rear of the forward skid member 43.

In the actual construction we are now describing, when the skid is extended as shown in FIGURE 1 and a landing is made upon soft ground, for example grass, a certain amount of penetration of the wheels into the soft ground is permitted. Hence in the drawing the contact plane of the wheels is shown a small distance below that of the skid. In a particular example this distance would be in the order of from two to three inches.

In operation, when the skid is extended and the aircraft is moving over soft ground upon the skid, irregularities in the ground surface cause the skid to be displaced in the direction substantially normal to the ground surface. This displacement is permitted by the linkage comprised by the skid-mounting links 37 and 38 being moved from its extended to its contracted position relative to the L-shaped links 26, 27. The movement of the skid is transmitted by guide links 51 to the triangularly shaped plates 22. These plates in turn pivot about the axle 15a and since they are connected with the cylinder 20 the whole movement is absorbed by the damper 18.

Following take-off, i.e. when the skid is not under load the damper 18 will extend due to the air spring until the pivot pins 21a, 21b have engaged in their associated semi-circular seatings 25 in the ears 24. Thereafter the damper will extend further thereby rotating the bogie frame 13 in a clockwise direction about the pivotal connection 12 until the damper is fully extended. Thus the rear wheels 15 and skid member 47 will be lowermost relatively to the aircraft structure when the latter is in horizontal flight.

Reference is now made to FIGURES 2 and 3. When it is desired to retract the skid relatively to the bogie frame 13 so that the wheels may be used for subsequent landing on to a conventional concrete runway and for take-off therefrom, the lock mechanism within the jack 33 is released and fluid pressure is applied to extend the jack 33. As a result the quadrilateral linkwork 14a, 15a, 30 and 29 will distort: the connecting links 28 will move in a rearward direction, the links 26, 27 and jack 33 swinging in an anti-clockwise direction respectively upon axle 15a, axle 14a and pivot 36. Movement of the quadrilateral linkwork 14a, 15a, 30 and 29 in this manner, results in anti-clockwise movement of the guide links 51 about pivots 50 and in the rearward movement of the skid members. Movement of the skid members with the connecting links 28 results in anti-clockwise movement of the guide links 48 about the pivots 50. In consequence the rearward skid member 47 folds in an anti-clockwise direction about the pivot 46.

The movements described above continue beyond the intermediate position shown in FIGURE 2 into the fully retracted and compact position shown in FIGURE 3. The locking means within the retraction jack 33 hold the jack in the extended position and thereby maintain retraction of the skid with respect to the bogie frame 13.

The bogie and skid arrangement described with reference to FIGURES 1-3 is intended for retraction into a wing or engine nacelle and therefore rotation of the bogie by the damper 18 can position the bogie substantially in line with respect to the strut 11 for convenient retraction.

Since, when the aircraft is approaching a runway upon landing, the trailing part of the skid (if extended) or the rear wheels are lowermost, the kinetic energy upon initial landing impact is absorbed by the damper 18, while the kinetic energy during the remainder of the touchdown is absorbed by the shock absorber (not shown) provided in association with the main strut 11.

When an undercarriage as described with reference to FIGURES 1-3 is used on certain aircraft, loading encountered by the trailing member 47 of the skid upon landing may be sufficiently great as to necessitate the provision of a spring device in the link 48. If this provision is made, means must be included to prevent extension of the link 48 by the spring device beyond its desired maximum length.

In the embodiment described with reference to FIGURE 1-3 only one retraction jack 33 was mentioned. However, two similar jacks could be provided, one attached to each of the two links 28. Alternatively it may be desirable to provide a further jack in association with skid part 47 so that this part may be retracted independently, for example for reducing the skid area under a particular operating condition of the aircraft, or for obtaining a desired sequence in the retracting movement of the skid as a whole to avoid contact of parts of the skid with any particular fixed part of the aircraft structure. Further, the jack or jacks 35 may not be connected directly onto the links 28 nor mounted on the bogie frame. For example, they may instead be mounted upon the lower end of the main strut 11 and conveniently connected with one of the arms 26 or 27, or any equivalent arrangement taking the place of these arms, through the intermediary of an angularly displaceable member coaxial with one of the bogie axles.

Turning now to the embodiment illustrated in FIGURES 4 and 5, a nosewheel strut 111, part only of which is shown, is provided with a telescoping member 112 of known construction having an axle 113 at its lower end, this axle carrying landing wheels 114, one on either side of the strut. A scissors linkage 115, also of known construction, connects the main part of the strut 111 with the telescoping member 112. Fixed with respect to member 112 by virtue of connection 116 and each adjacent one of the wheels 114, are two plates 117. These plates are supported upon the axle 113 and a third point 118 upon each of them is respectively pivotally connected to one end of one of a pair of links 119. The pair of links 119 are pivotally connected at their other ends at 120 to the cylinder 121 of a skid retraction jack 122. The piston rod 123 of this jack is connected at 124 with an intermediate point along a pair of support links 125 pivotally supported upon the axle 113. The end of each support link 125 is pivotally connected at 126 to one end of one of a pair of links 127, the other ends of these links 127 connecting with the jack cylinder at the pivotal connection 120. The plate 117, and links 119, 127, 125 in effect define a quadrilateral, the pivots of which are 113, 118, 120 and 126.

A short link 128 taken rearwardly and downwardly (in FIGURE 4 of the drawings) from the pivotal connection 120, pivotally connects at 129 with a single skid member 130. A short link 131 taken rearwardly and downwardly (in FIGURE 4 of the drawings) from the pivotal connection 126, pivotally connects at 132 with a forward point on the skid member 130. Extending upwardly and rearwardly (in FIGURE 4 of the drawings) from the pivotal connection 132, is the piston rod 133 of an air-spring damper 134, the cylinder 135 of this damper being pivotally connected between the support links 125 at a point 136.

The links 119 are each provided with an inclined abutment face 137 near their ends adjacent to plates 117.

When the skid is extended as shown in FIGURE 4 and a landing is made upon soft ground, a certain amount of penetration of the wheels into the soft ground is permitted. Hence as in the previous construction of FIGURES 1-3, the contact plane of the wheels is shown a small distance below that of the skid.

In operation, when the skid 130 is extended and the aircraft is moving over soft ground upon the skid, irregularities in the ground surface cause the skid to be displaced in a direction substantially normal to the ground surface. This displacement is permitted by the linkage comprising the skid-mounting links 128 and 131 moving from an extended to a partially contracted position, the movement being absorbed by the damper 134.

For retraction of the skid 130 with respect to the wheels 114 the jack 122 is extended, thereby distorting the quadrilateral 113, 118, 120 and 126 displacing the links 119 about their pivotal connections 118 to the fixed plates 117 in an anti-clockwise direction. As this movement continues, by virtue of the links 127 and the fixed point 118, the displacement of links 119 effects anti-clockwise movement of the supporting links 125 about the axle 113 and the whole assembly pivots about the axle in an anti-clockwise direction away from the position in which the skid member 130 is parallel or substantially parallel with the ground, until the skid finally takes up a position some 105° displaced from this position.

While this movement is occurring the damper 134, by virtue of its pivotal connection 136 on the supporting links 125, controls the position of the skid member 130 with respect to the links 127. That is, as the whole system swings in an anti-clockwise direction the linkage comprised by links 128, 131 is moved to its compact position so that the skid member 130 is closed against the links 127 to give it a compact finally retracted position.

In FIGURE 5 the strut is shown in a shortened position this having been achieved in known manner by a mechanism (not shown) associated with member 112. In this shortened position the abutment faces 137 on the links 119 have closed on to the lower member of the scissors linkage 115 thereby limiting further movement of the mechanism.

In known manner, locking means may be provided in the jack 122 for both the extended and retracted positions of the system.

As with the constructions of FIGURES 1–3, the wheel and skid arrangement above described may be arranged for retraction into a part of the aircraft structure in known manner.

The design of the skid, its mounting linkage and the jack is such that the arrangement may be used for jacking the aircraft when on the ground. The skid area is calculated on the basis of the designed all-up-weight of the aircraft and the take-off power available correlated with the coefficient of friction value pertaining to the worst ground condition from which that aircraft would be expected to take off, to give a reasonable friction drag and thus a take-off run which is not prohibitive in length.

This invention is not limited to the precise constructional details hereinbefore described.

We claim:

1. For an aircraft, a skid mechanism comprising in combination an undercarriage adapted to carry at least one ground engaging wheel, a skid, a retraction linkwork connected to the undercarriage and having at least four supporting links freely pivoted to one another and arranged in the form of a quadrilateral and a jack connected between two parallel links of the linkwork so that on movement thereof the shape of the quadrilateral will change, a linkage connecting the skid to the retraction linkwork in such a way that on such change of shape of the quadrilateral, the skid will move relatively to the undercarriage, said linkage being movable between an extended position and a contracted position relative to the retraction linkwork and spring means for urging the linkwork into its extended position, the dimensions of the components of said linkwork being such that on contraction thereof the skid will be so compactly arranged with respect to the wheel or wheels that the entire undercarriage may be retracted into a retraction bay in said aircraft.

2. An aircraft undercarriage comprising a leg, a skid, a quadrilateral linkage comprising first, second, third and fourth quadrilateral links pivoted together, the said first link being connected to said leg, retraction means disposed between and connected at its ends to two of said quadrilateral links which are parallel to each other and being operable to change the configuration of said quadrilateral linkage between an extended configuration and a retracted configuration, and a support linkage comprising two support links connected at one end to said second and third links and at the other end at spaced locations to said skid.

3. An aircraft undercarriage comprising a leg, a skid, a quadrilateral linkage comprising first, second, third and fourth quadrilateral links pivoted together, the said first link being connected to said leg, retraction means disposed between and connected at its ends to two of said quadrilateral links which are parallel to each other and being operable to change the configuration of said quadrilateral linkage between an extended configuration and a retracted configuration, a support linkage comprising two support links connected at one end to said second and third links and at the other end at spaced locations to said skid and compression spring means connected between said skid and one of said quadrilateral links.

4. An aircraft undercarriage comprising a leg, a skid, a quadrilateral linkage comprising first, second, third and fourth quadrilateral links pivoted together, the said first link being connected to said leg, retraction means disposed between and connected at its ends to two of said quadrilateral links which are parallel to each other and being operable to change the configuration of said quadrilateral linkage between an extended configuration and a retracted configuration, a support linkage comprising two support links connected at one end to said second and third links and at the other end at spaced locations to said skid and compression spring means connected between said skid and said strut.

5. An aircraft undercarriage comprising a leg, a skid, a quadrilateral linkage comprising first, second, third and fourth quadrilateral links pivoted together, the said first link being connected to said leg, retraction means disposed between and connected at its ends to two of said quadrilateral links which are parallel to each other and being operable to change the configuration of said quadrilateral linkage between an extended configuration and a retracted configuration, a support linkage comprising two support links connected at one end to said second and third links and at the other end at spaced locations to said skid, a first connecting link having a first and second end and being pivoted at said first end to said skid, a second connecting link pivoted to said first quadrilateral link and spaced therefrom to the second end of said first connecting link, and compression spring means connected to said second connecting link at a location spaced from the first quadrilateral link and first connecting link and to said leg at a location spaced from said first quadrilateral link.

6. An aircraft undercarriage comprising a leg, a multi-part skid comprising a forward part and a rear part pivoted to said forward part, a quadrilateral linkage comprising first, second, third and fourth quadrilateral links pivoted together, the said first link being connected to said leg, retraction means connected at its ends to two of said quadrilateral links and being operable to change the configuration of said quadrilateral linkage between an extended configuration and a retracted configuration, a support linkage comprising two support links connected at one end to said second and third links and at the other end at spaced locations to said forward part of said skid, a first connecting link having a first end and a second end, whereof the first end is pivoted to said skid, a second connecting link pivoted about a first axis to said first quadrilateral link, a third connecting link having a first end and a second end whereof the first end is connected to said rear part of said skid at a location spaced from said forward part, the second ends of said first and third supporting links being pivoted to said second link about a second axis parallel to and spaced from said first axis, and compression spring means pivoted to said second supporting link about a third axis parallel to and spaced from said first and second axes and to said leg at a location spaced from said first link.

7. In or for an aircraft, a skid mechanism comprising a combination a bogie undercarriage including a bogie frame carrying a plurality of ground engaging wheels, a skid, a linkage movable between an extended position and a contracted position connecting the skid and undercarriage and spring means for urging the linkage to its extended position, said linkage and said skid when in their contracted position being so compactly arranged with respect to the wheel or wheels that the entire undercarriage may be retracted into a retraction bay in said aircraft.

8. The skid mechanism as claimed in claim 7 wherein the linkage embodies a parallel motion linkwork.

9. A mechanism for supporting a skid on the undercarriage leg of an aircraft, a retraction linkage composed of links and joints by which the links are pivotally connected together and which define a quadrilateral, one of the links being connectible to the undercarriage leg and the link opposite carrying the skid, and a jack connected at its two ends to two of the links respectively, extending along opposite sides of the quadrilateral such that when the length of the jack is adjusted, the links move relative to each other to adjust the distance of the skid from the point of connection of the said one link to the undercarriage leg.

10. A retraction linkwork as claimed in claim 9 wherein the jack is connected to the said links intermediate the ends thereof.

11. A retraction linkwork as claimed in claim 9 wherein one of the supporting links is adapted to be fixed relatively to an undercarriage, the linkwork further comprising spring means connected at one end to one of the supporting links pivoted to the fixed link and at its other end to the skid.

12. An aircraft undercarriage including an undercarriage leg, a skid, and a mechanism connected to the leg and carrying the skid and adapted to permit retraction and extension of the skid relative to the leg, which mechanism comprises a linkage composed of links which are pivotally jointed together, the joints of the linkage defining a quadrilateral, and one of the links being pivotally connected to the leg and the other links being suspended from this one link, jack means disposed between and connected to two of said links, which links are opposite each other, the jack means being arranged on alteration of the length thereof to alter the configuration of the linkage and change the distance of the skid from the leg, a parallelogram linkage by which the skid is suspended from the first said linkage, and means resiliently urging the skid into spaced relationship with the first said linkage.

13. An aircraft undercarriage as claimed in claim 12, wherein the first linkage is connected to the parallelogram linkage to actuate closure thereof to bring the skid closer to said first linkage when the jack means is operated in the sense to retract the skid relative to the leg.

References Cited in the file of this patent
UNITED STATES PATENTS

| | | |
|---|---|---|
| 1,892,064 | Markey | Dec. 27, 1932 |
| 2,106,934 | Saulnier | Feb. 1, 1938 |
| 2,842,325 | Green | July 8, 1958 |
| 2,925,970 | Heaslip | Feb. 23, 1960 |

FOREIGN PATENTS

| | | |
|---|---|---|
| 231,811 | Switzerland | July 17, 1944 |